(12) United States Patent
Leroyer et al.

(10) Patent No.: US 11,521,326 B2
(45) Date of Patent: Dec. 6, 2022

(54) SYSTEMS AND METHODS FOR MONITORING AND EVALUATING BODY MOVEMENT

(71) Applicant: Prove Labs, Inc., Brooklyn, NY (US)

(72) Inventors: Jérémie Leroyer, Brooklyn, NY (US); Cyril Porteret, Paris (FR)

(73) Assignee: Prove Labs, Inc., Brooklyn, NY (US)

( * ) Notice: Subject to any disclaimer, the term of this patent is extended or adjusted under 35 U.S.C. 154(b) by 839 days.

(21) Appl. No.: 16/420,329

(22) Filed: May 23, 2019

(65) Prior Publication Data
US 2019/0362506 A1 Nov. 28, 2019

Related U.S. Application Data

(60) Provisional application No. 62/675,268, filed on May 23, 2018.

(51) Int. Cl.
*G06K 9/62* (2022.01)
*G06T 7/246* (2017.01)
(Continued)

(52) U.S. Cl.
CPC .............. *G06T 7/251* (2017.01); *G06F 21/32* (2013.01); *G06T 7/97* (2017.01); *G06V 20/40* (2022.01); *G06V 40/20* (2022.01); *G09B 19/0038* (2013.01); *G06N 3/08* (2013.01); *G06T 2207/10016* (2013.01); *G06T 2207/30196* (2013.01)

(58) Field of Classification Search
CPC .......... A63B 24/0003; A63B 2220/806; A63B 2220/807; G06V 20/52–20/53; G06V 40/23–40/25; G06T 2207/30196; G06T 7/251; G09B 19/003–19/0038
See application file for complete search history.

(56) References Cited

U.S. PATENT DOCUMENTS 5,904,484 A 5/1999 Burns
7,317,836 B2 1/2008 Fujimura et al.
(Continued)

FOREIGN PATENT DOCUMENTS

WO 2002095714 11/2002

OTHER PUBLICATIONS

Pfister et al., "Deep Convolutional Neural Networks for Efficient Pose Estimation in Gesture Videos", Conference Paper • Nov. 2014, ResearchGate, cover page and pp. 1-16 of the article. (Year: 2014).*
(Continued)

*Primary Examiner* — Brian Werner
(74) *Attorney, Agent, or Firm* — Tatonetti IP

(57) ABSTRACT

The present disclosure relates to systems and methods for analyzing and evaluating movement of a subjects and providing feedback. In some embodiments, a method comprises receiving one or more images of a body of the subject captured during performance of a physical movement by the subject; computing a model descriptive of positions and orientations of body parts of the subject based on the one or more images; generating a comparison of the positions and orientations to target positions and target orientations, respectively, for the physical movement; and generating a recommendation based on the comparison.

30 Claims, 11 Drawing Sheets

(51) Int. Cl.
*G06T 7/00* (2017.01)
*G09B 19/00* (2006.01)
*G06F 21/32* (2013.01)
*G06V 20/40* (2022.01)
*G06V 40/20* (2022.01)
*G06N 3/08* (2006.01)

(56) References Cited

U.S. PATENT DOCUMENTS

| | | | |
|---|---|---|---|
| 8,702,485 B2 | 4/2014 | Flury et al. | |
| 8,712,510 B2 | 4/2014 | Quy | |
| 9,011,293 B2 | 4/2015 | Shavit et al. | |
| 9,177,387 B2 | 11/2015 | Marks | |
| 9,204,823 B2 * | 12/2015 | Derenne | G08B 21/245 |
| 9,364,714 B2 | 6/2016 | Koduri et al. | |
| 9,501,942 B2 | 11/2016 | Kaleal et al. | |
| 9,589,207 B2 | 3/2017 | Holohan | |
| 9,619,039 B2 | 4/2017 | Whelan | |
| 9,633,254 B2 | 4/2017 | Bose et al. | |
| 2007/0219059 A1 | 9/2007 | Schwartz et al. | |
| 2011/0175810 A1 | 7/2011 | Markovic et al. | |
| 2011/0306396 A1 * | 12/2011 | Flury | G06F 3/017 463/32 |
| 2012/0190505 A1 * | 7/2012 | Shavit | A63B 24/0062 482/8 |
| 2013/0178960 A1 * | 7/2013 | Sheehan | G16H 40/67 700/91 |
| 2015/0005910 A1 | 1/2015 | Ishii et al. | |
| 2015/0139502 A1 * | 5/2015 | Holohan | G06T 7/251 382/107 |
| 2017/0213080 A1 | 7/2017 | Nathan et al. | |
| 2017/0316578 A1 | 11/2017 | Fua et al. | |
| 2018/0144186 A1 * | 5/2018 | Wnuk | G06F 16/2228 |
| 2018/0204481 A1 * | 7/2018 | Nejat | G09B 19/0015 |
| 2018/0285697 A1 | 10/2018 | Shotton et al. | |

OTHER PUBLICATIONS

Mehta, et al., "VNect: Real-time 3D Human Pose Estimation with a Single RGB Camera", May 3, 2017, Max Planck Institute for Informatics, https://arxiv.org/pdf/1705.01583.pdf, 13 pages.

Jain, et al., "MoDeep: A Deep Learning Framework Using Motion Features for Human Pose Estimation", Sep. 28, 2014, New York University, https://arxiv.org/pdf/1409.7963.pdf, 15 pages.

* cited by examiner

SYSTEMS AND METHODS FOR MONITORING AND EVALUATING BODY MOVEMENT

CROSS-REFERENCE TO RELATED APPLICATION

This application claims the benefit of priority of U.S. Provisional Patent Application No. 62/675,268, filed on May 23, 2018, of which the disclosure is hereby incorporated by reference herein in its entirety.

TECHNICAL FIELD

The present disclosure relates to the field of body movement evaluation. More specifically, the present disclosure relates to systems and methods for monitoring and evaluating body movements and generating feedback.

BACKGROUND

Motion tracking systems implemented on mobile devices have been developed to guide individuals through exercise plans, track progress, and provide guidance on performing specific movements. However, such systems generally do not provide meaningful feedback to the subject, and are not tailored to the subject's particular physiology.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION

Figure 1A:
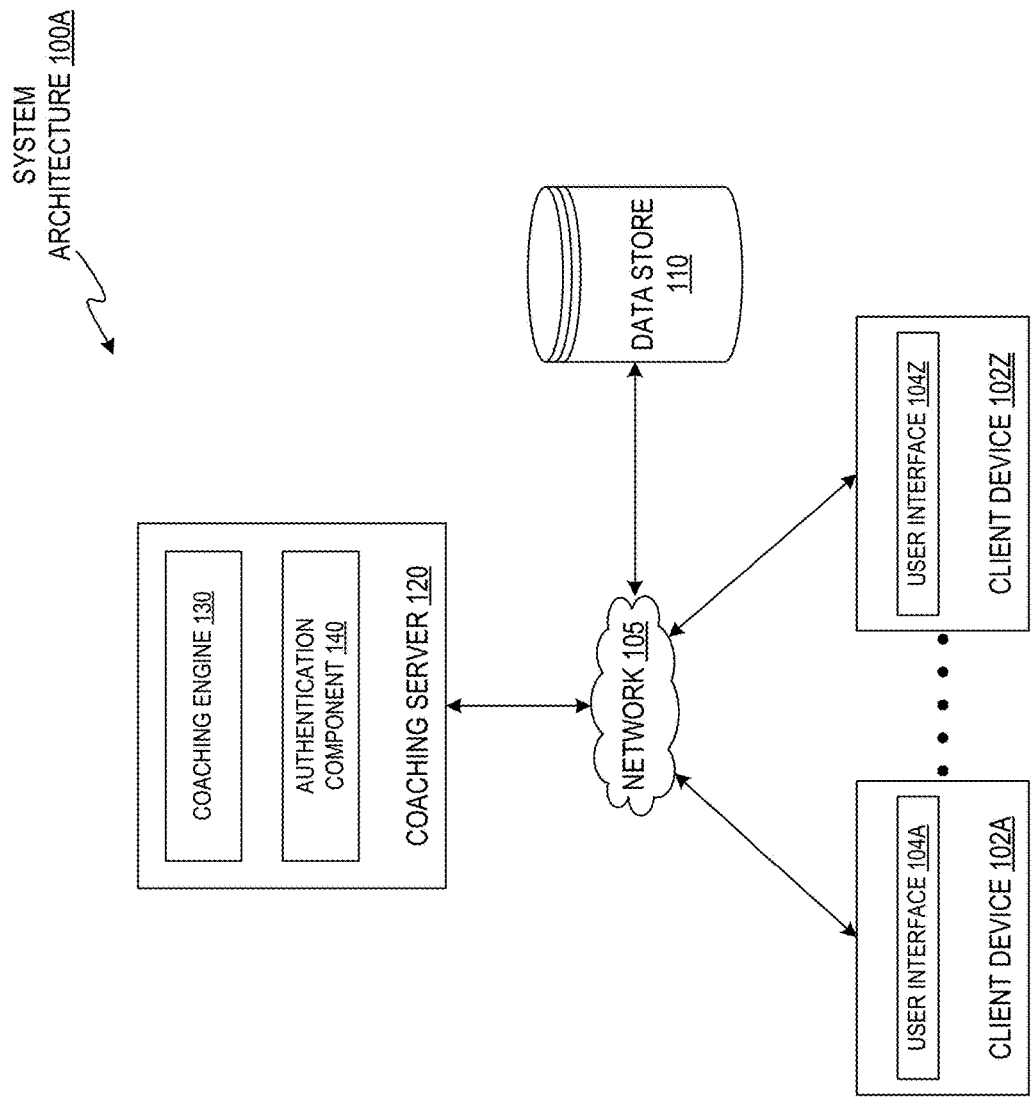
FIG. 1A illustrates an exemplary system architecture in accordance with an embodiment of the present disclosure.

Disclosed herein are embodiments for monitoring and evaluating body movements of a subject and providing feedback, evaluation, and recommendations. Certain embodiments pertain specifically to evaluating human movement of an exercise subject. Such embodiments provide a method for enabling the exercise subject to film himself/herself while performing an exercise or physical activity with his/her device (e.g., a smartphone or other mobile device), and receive automated feedback on the quality of execution of his/her movements, as well recommendations on how to better perform the movements. In some embodiments, the movements of the exercise subject are captured with a camera while the subject is performing the exercise, for example, using video capability of a smartphone. The captured video (or still images) may be processed locally in some embodiments, transmitted to a server for processing, or a combination of both, and the generated feedback and recommendations are provided to the exercise subject via his/her personal device. In some embodiments, the feedback and recommendations are provided in real-time while the movements are being performed, or after the exercise subject has concluded performing the movements. The feedback and recommendations may be provided, for example, in a form of a visual feedback via a display device and/or audio feedback.

Certain embodiments of the present disclosure combine biometric authentication with body movement detection, which may be used to ensure that the subject performing the movements or exercise is the individual that has been authenticated by the device used to capture the subject. Authentication may be performed, for example, using Face ID or Touch ID technologies, or a combination of authentication technologies. Authentication may be performed, in some embodiments, prior to analyzing the subject's movements. In some embodiments, if a video of the subject is captured for analysis purposes, the subject's face may be recognizable at the beginning of the video, which may be used to generate authentication data. In some embodiments, the authentication data may be used as evidence that a particular subject has performed the exercises. For example, a company may require that its employees perform injury prevention exercises as part of an injury prevention plan, for which authentication data may be used in connection with providing monetary benefits to the employees for their compliance, and/or may be transmitted to an insurance company as evidence of compliance in order to receive compensation (e.g., in the form of an insurance credit).

Although embodiments of the present disclosure are discussed in terms of analyzing and evaluating human exercise movements, the embodiments may also be generally applied to any environment for which motion analysis is applicable. For example, the embodiments may be used in evaluating motions associated with fitness and recreational activities in general, such as sports (e.g., golf, tennis, and martial arts), physical therapy, and rehabilitation or to any professional activity involving a qualified movement into a workflow. The embodiments may also be used in connection with wellness physical therapy, injury prevention, and musculoskeletal disease prevention in the workspace (e.g., warehouses, construction, lines, etc.).

The embodiments are not limited to human activity, and may be applied in analyzing and evaluating the motion of animals, robots, and computer-generated models. Thus, embodiments of the present disclosure are not limited to human exercise. Thus, as used herein, the term "subject" may refer generally to humans, animals, robots, or computer-generated models, unless the context indicates otherwise.

FIG. 1A illustrates an exemplary system architecture 100A, in accordance with an embodiment of the present disclosure, for evaluating body movement. The system architecture 100A includes client devices 102A-102Z, a data store 110, and a coaching server 120, with each device of the system architecture 100A being communicatively coupled via a network 105. One or more of the devices of the system architecture 100A may be implemented using computer system 800, described below with respect to FIG. 8.

In one embodiment, network 105 may include a public network (e.g., the Internet), a private network (e.g., a local area network (LAN), a wide area network (WAN), or a Bluetooth network), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. Although the network 105 is depicted as a single network, the network 105 may include one or more networks operating as a stand-alone networks or in cooperation with each other. The network 105 may utilize one or more protocols of one or more devices that are communicatively coupled thereto. The network 105 may translate protocols to/from one or more protocols of the network devices.

In one embodiment, the data store 110 may include one or more of a short-term memory (e.g., random access memory), a cache, a drive (e.g., a hard drive), a flash drive, a database system, or another type of component or device capable of storing data. The data store 110 may also include multiple storage components (e.g., multiple drives or multiple databases) that may also span multiple computing devices (e.g., multiple server computers). In some embodiments, the data store 110 may be cloud-based. One or more of the devices of system architecture 100A may utilize their own storage and/or the data store 110 to store public and private data, and the data store 110 may be configured to provide secure storage for private data. In some embodiments, the data store 110 may be used for data back-up or archival purposes.

The client devices 102A-102Z may each include computing devices such as personal computers (PCs), laptops, mobile phones, smart phones, tablet computers, netbook computers, etc. Client devices 102A-102Z may also be referred herein as "user devices" or "mobile devices." An individual user may be associated with (e.g., own and/or use) one or more of the client devices 102A-102Z. The client devices 102A-102Z may each be owned and utilized by different users at different locations. As used herein, a "user" may be represented as a single individual. However, other embodiments of the present disclosure encompass a "user" being an entity controlled by a set of users and/or an automated source. For example, a set of individual users federated as a community in a company or government organization may be considered a "user." In some embodiments, one or more of the client devices 102A-102Z may be used by a healthcare provider (e.g., a physician or therapist) for evaluating a subject.

Figure 4:
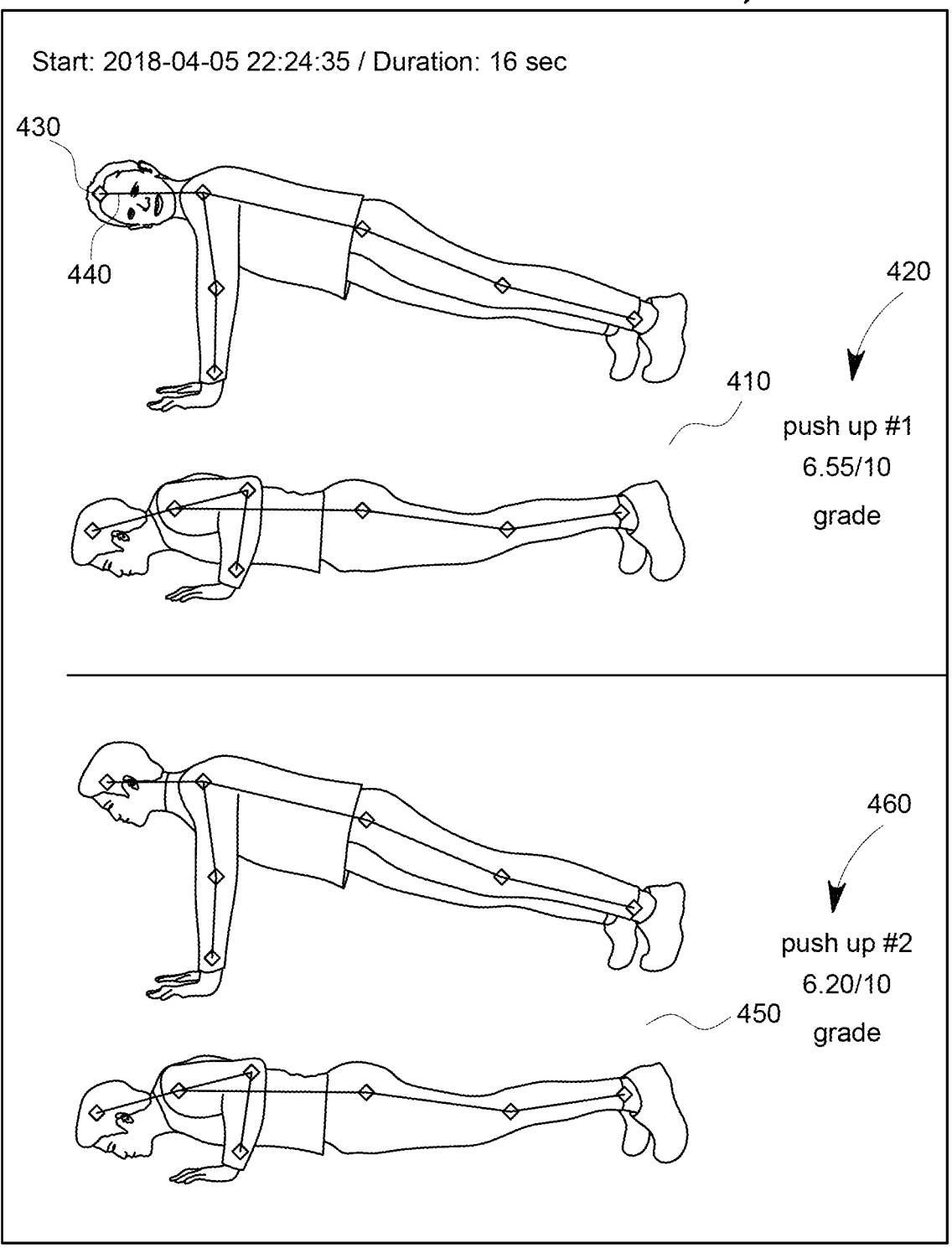
FIG. 4 illustrates a user interface for evaluating and grading exercise positions accordance with an embodiment of the present disclosure.
Figure 5:
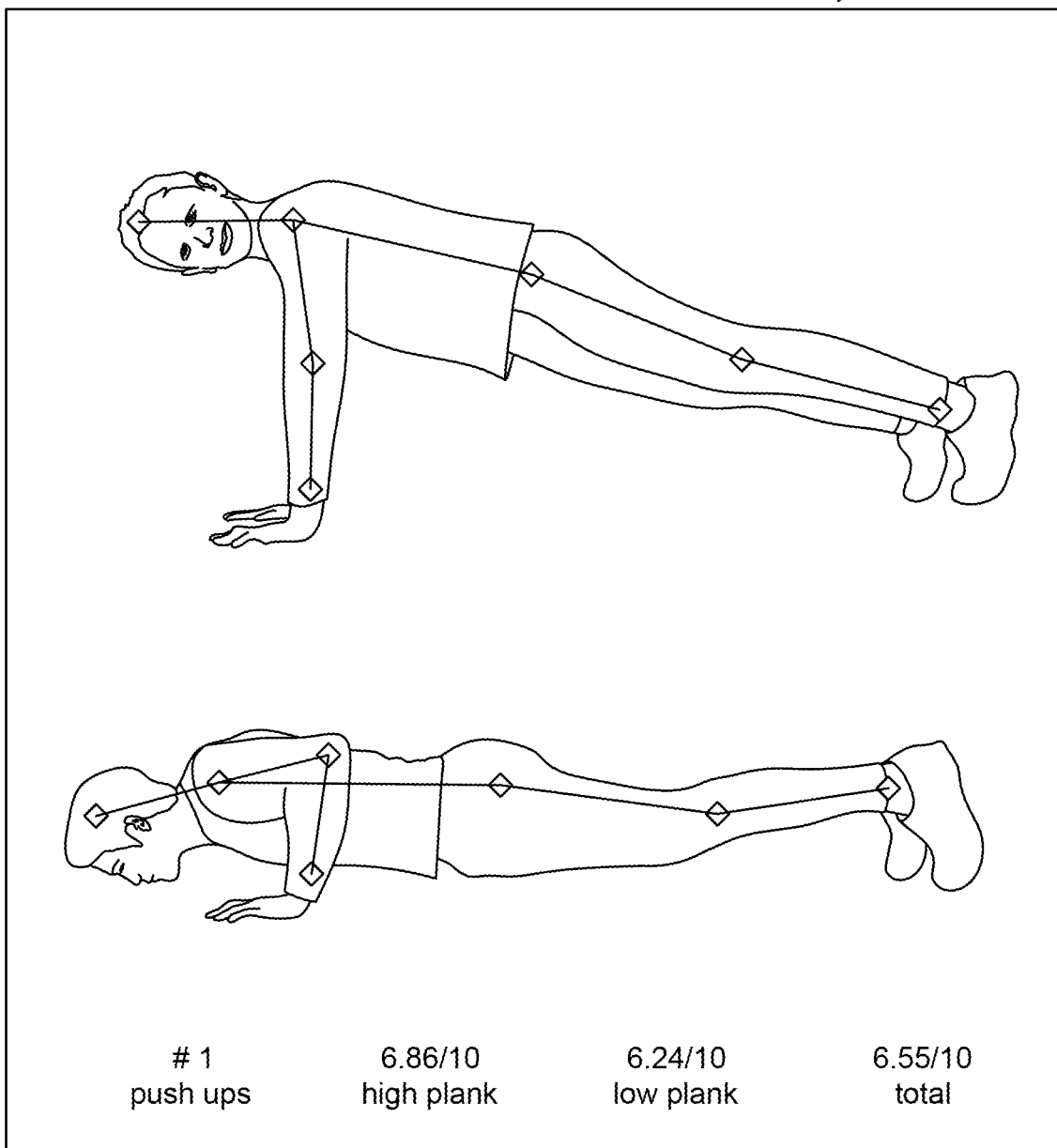
FIG. 5 illustrates a user interface for further evaluating grading exercise positions accordance with an embodiment of the present disclosure.
Figure 6:
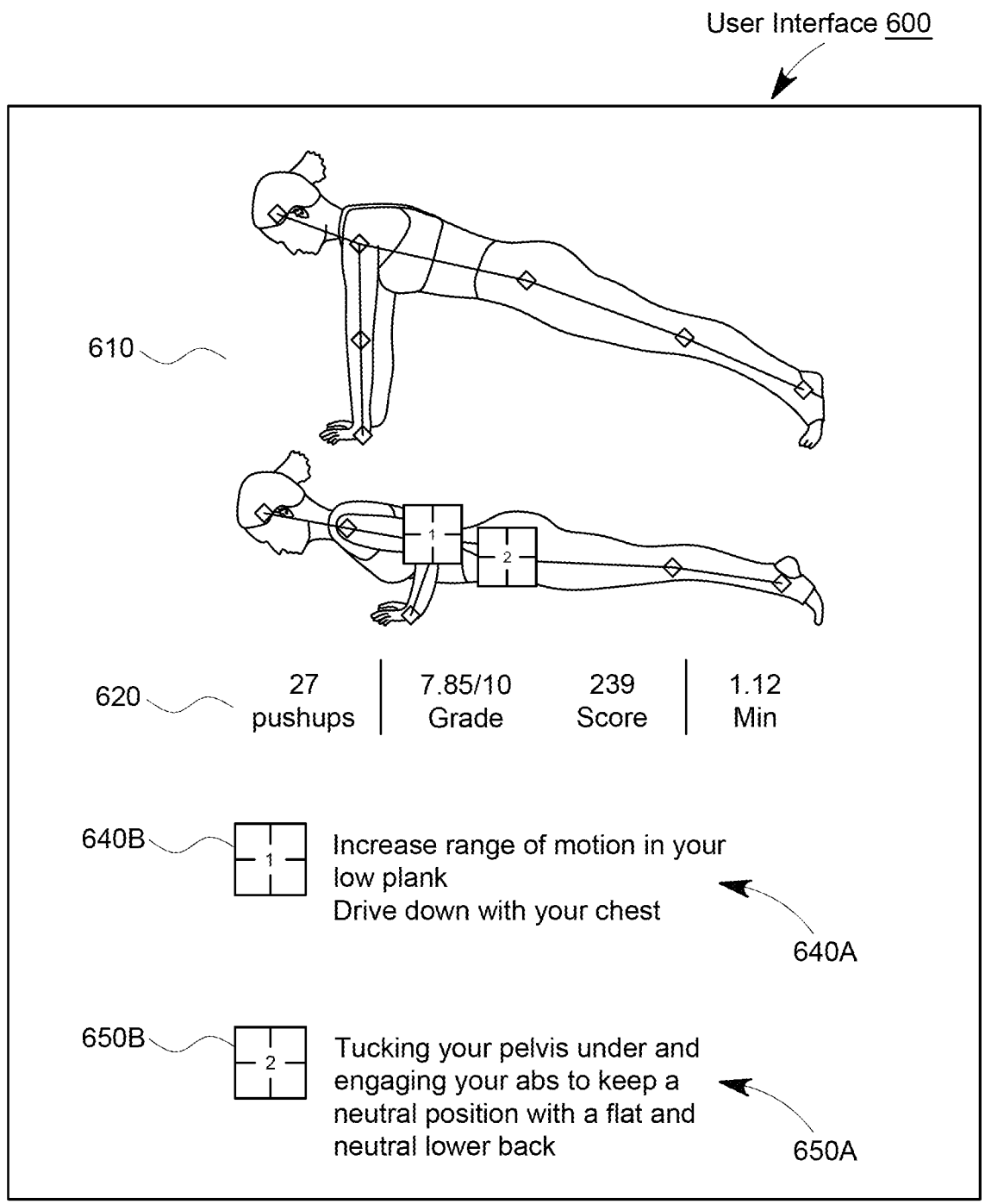
FIG. 6 illustrates a user interface for providing visual feedback with respect to performance of an exercise movement in accordance with an embodiment of the present disclosure.

The client devices 102A-102Z may each implement user interfaces 104A-104Z, respectively. Each of the user interfaces 104A-104Z may allow a user of the respective client device 102A-102Z to send/receive information to/from each other, the data store 110, and the coaching server 120. For example, one or more of the user interfaces 104A-104Z may be a web browser interface that can access, retrieve, present, and/or navigate content (e.g., web pages such as Hyper Text Markup Language (HTML) pages) provided by the coaching server 120. As another example, one or more of the user interfaces 104A-104Z may enable data visualization with their respective client device 102A-102Z. In one embodiment, one or more of the user interfaces 104A-104Z may be a standalone application (e.g., a mobile "app," etc.), that allows a user of a respective client device 102A-102Z to send/receive information to/from each other, the data store 110, and the coaching server 120. FIGS. 4-6 provide examples of user interfaces in accordance with the embodiments described herein, and are discussed in greater detail below.

In some embodiments, the client devices 102A-102Z may each utilize local data stores in lieu of or in combination with the data store 110. Each of the local data stores may be internal or external devices, and may include one or more of a short-term memory (e.g., random access memory), a cache, a drive (e.g., a hard drive), a flash drive, a database system, or another type of component or device capable of storing data. The local data stores may also include multiple storage components (e.g., multiple drives or multiple databases) that may also span multiple computing devices (e.g., multiple server computers). In some embodiments, the local data stores may be used for data back-up or archival purposes.

In one embodiment, the coaching server 120 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to retrieve content metadata used for generating a volatility index. The coaching server 120 includes a coaching engine 130 and an authentication component 140, which will be described below in detail with respect to FIG. 2.

Although each of the client devices 102A-102Z, the data store 110, and the coaching server 120 are depicted in FIG. 1A as single, disparate components, these components may be implemented together in a single device or networked in various combinations of multiple different devices that operate together. In some embodiments, some or all of the functionality of the coaching server 120 may be performed by one or more of the client devices 102A-102Z. For example, the client device 102A may implement a software application that performs some or all of the functions of the coaching engine 130 and/or the authentication component 140.

Figure 1B:
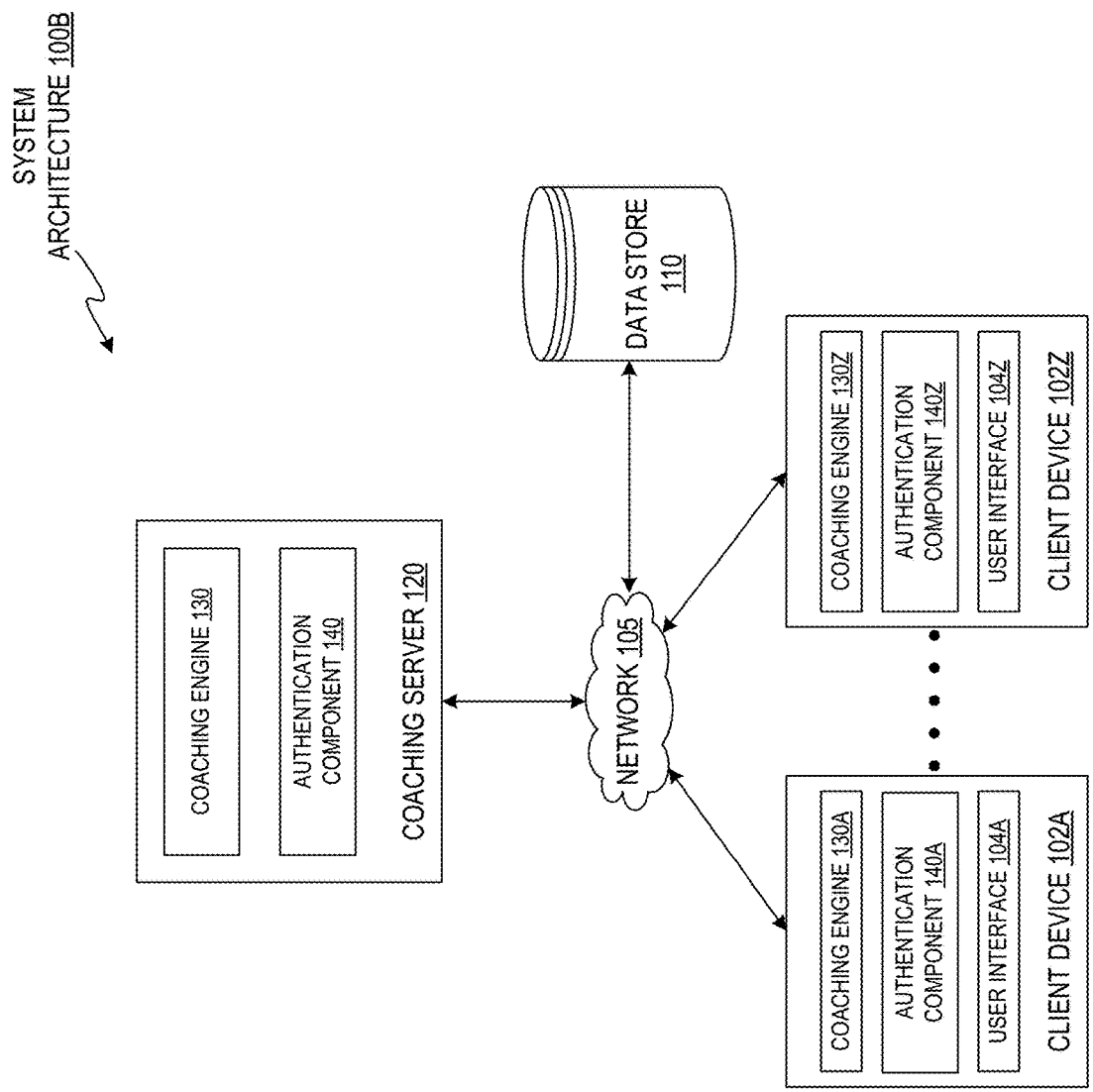
FIG. 1B illustrates an exemplary system architecture in accordance with another embodiment of the present disclosure.
Figure 1C:
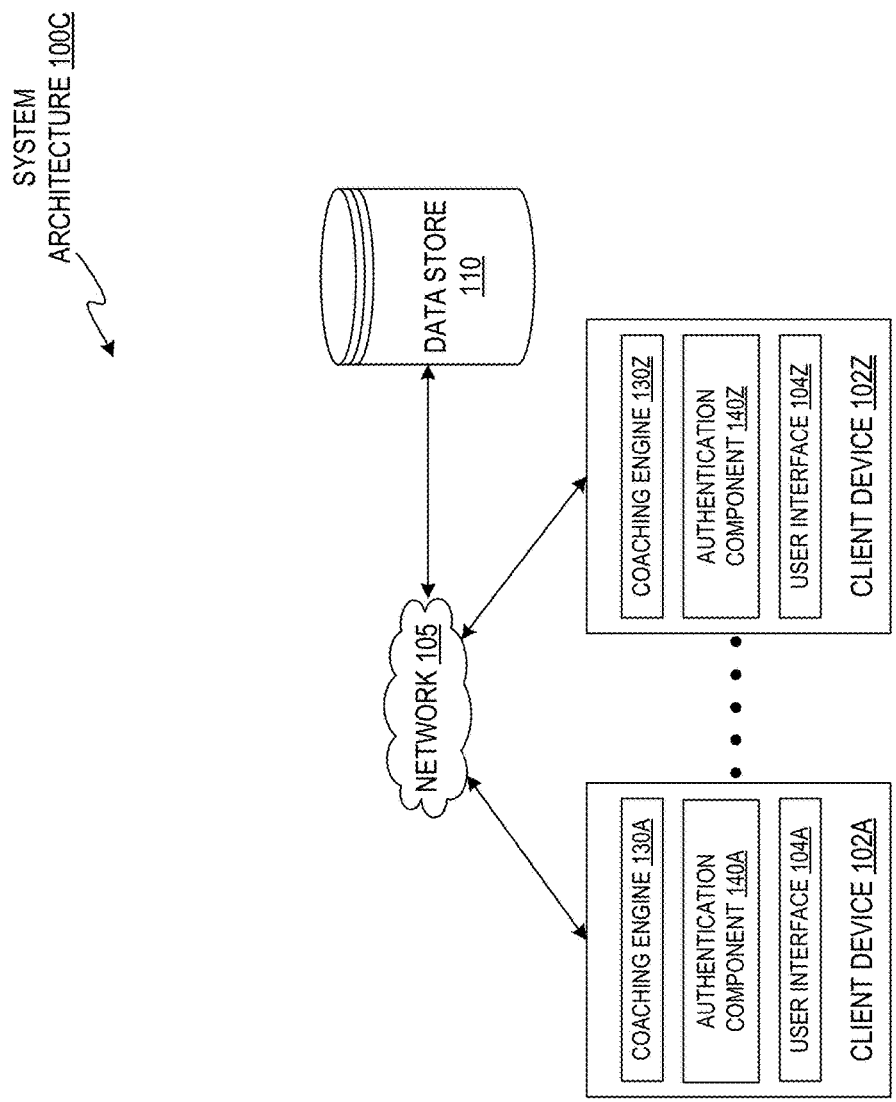
FIG. 1C illustrates an exemplary system architecture in accordance with another embodiment of the present disclosure.

FIGS. 1B and 1C illustrate exemplary system architectures 100B and 100C, respectively, which differ from the system architecture 100A. For example, the system architecture 100B illustrates embodiments where at least some of the functionality of the coaching engine 130 and the authentication component 140 is implemented across the client devices 102A-102Z (as coaching engines 130A-130Z and authentication components 140A-140Z). The system architecture 100C illustrates embodiments where all of the functionality of the coaching server 120 is performed locally by the client devices 102A-102Z. In such embodiments, the coaching server 120 may be omitted.

Figure 2:
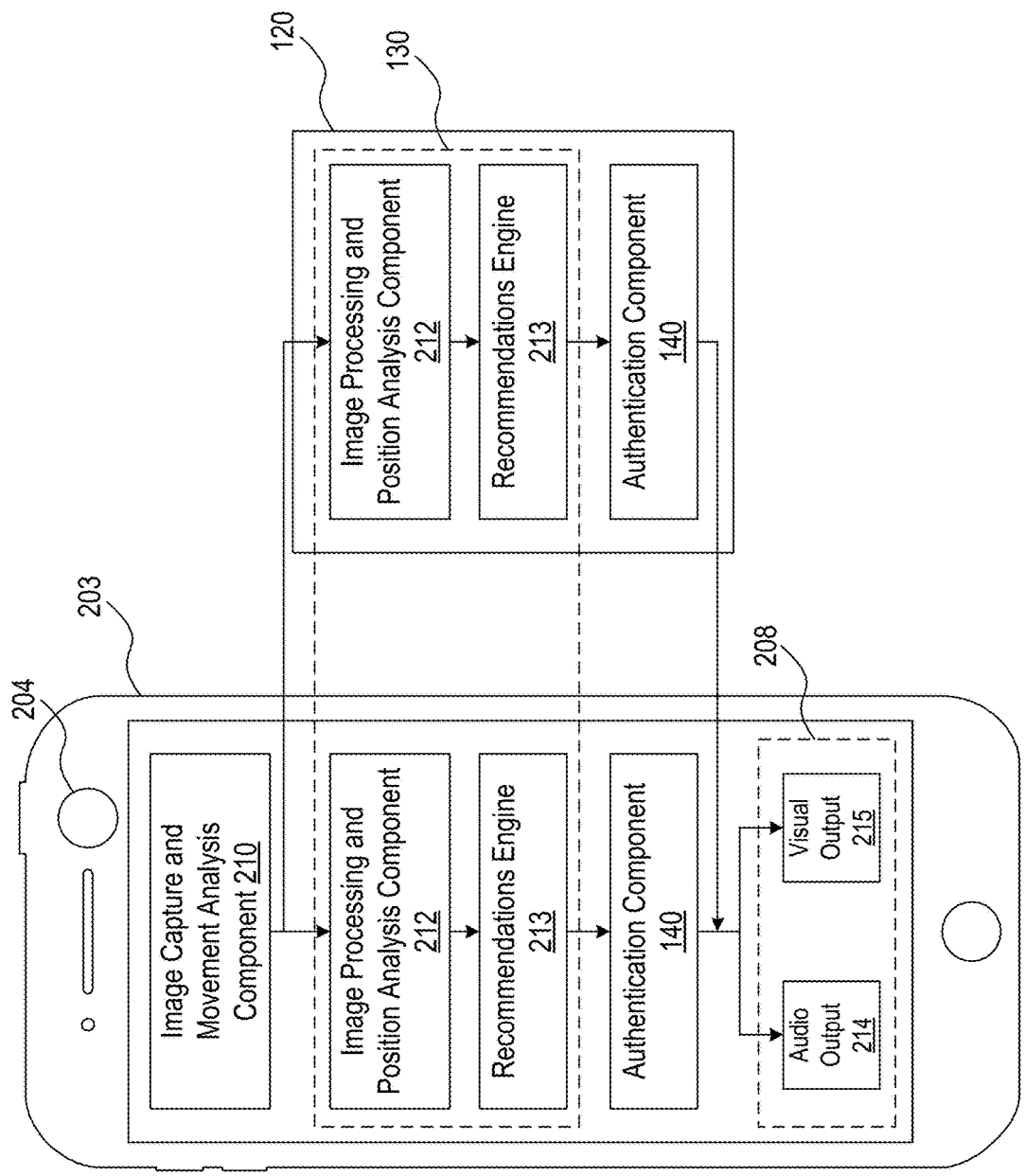
FIG. 2 illustrates an exemplary data flow architecture for evaluating exercise movements in accordance with an embodiment of the present disclosure.

FIG. 2 is a block diagram illustrating an exemplary data flow architecture 200 in accordance with an embodiment of the present disclosure. The data flow architecture 200 illustrates a client device 203 (which may be representative of or similar to one of the client devices 102A-102Z) and the coaching server 120.

In some embodiments, the client device 203 is a mobile device that is equipped with a built-in camera 204 and output functionality 208, which provides output in the form of audio output 214 (e.g., speakers) and/or a visual output 215 (e.g., a touch-screen display). The client device 203 may implement an image capture and movement analysis component 210 to capture video and/or still images using the camera 204. The captured video and/or still images may be stored locally on the client device 203, or transmitted to a separate device for storage and analysis, such as the coaching server 120 or the data store 110. In some embodiments, the client device 203 may utilize one or more separate cameras, such as a smart camera. The client device 203 and camera may communicate with each other via Bluetooth. Any device that includes a built-in camera, or a camera mounted thereon, may be used as the client device 203. For example, in certain embodiments, a drone or robot having a built-in camera or mounted camera may be used to capture video of a subject, and may move the camera around relative to the subject to optimize the field of view of the camera.

In some embodiments, the image capture and movement analysis component 210 may perform real-time movement analysis component to track the subject's motion in real-time using captured video. For example, regions of interest may be identified in the video corresponding to joints and other specific aspects of the subject's body, which may be used to generate a model of the subject's physiology.

The coaching engine 130 of FIG. 1A is illustrated as being fully implemented by the coaching server 120, but is not necessarily implemented as such in other embodiments. For example, as depicted by the split paths in FIG. 2, the functionality of the coaching engine 130 may be performed solely by the client device 203, may be performed solely by the coaching server 120, or the functionality may be distributed across the client device 203 and the coaching server 120 (or other suitable devices). For example, the coaching server 120 may offload rigorous computations from the client device 203. The coaching server 120 may be distant from the client device or local to the client device, or the client device, in some embodiments, may perform the functionality of the coaching server 120 and effectively act as the coaching server 120.

The coaching engine 130 may include an image processing and position analysis component 212 and a recommendations engine 213. In some embodiments, the image processing and position analysis component 212 is implemented by the coaching server 120 (e.g., the client device 203 may stream video or transmit images captured by the camera 204 to the coaching server 120 for analysis). Recommendations or feedback generated by the recommendation engine 213 may be presented to the subject via audio output 214 or visual output 215, and may be presented in the form of a counter (e.g., number of repetitions), a grade, analysis, and/or recommendations to improve form.

In some embodiments, the coaching engine 130 may analyze static images or may analyze frames extracted from a video feed (during post-processing or in real-time) to detect relevant positions and orientations of the subject for a particular movement (which may also be referred to as "target positions" and "target orientations," respectively). These relevant positions and orientations are identified, for example, using the image processing and position analysis component 212 (which may implement a convolutional neural network (CNN) component), or using a separate CNN component. In some embodiments, the CNN component is implemented on the client device. In some embodiments, the image processing may be performed utilizing a central processing unit (CPU) or graphics processing unit (GPU) of the client device in order to perform static image matching and to identify the relevant positions from the video feed (e.g., "high plank" and "low plank" in the case of a push-up). In some embodiments, the client device may process the image locally (e.g., if there is no server connection) to count and/or time repetitions of the movement in real time and provide feedback and recommendations to the subject (e.g., audio or visual feedback).

As used herein, a CNN may be a special neural network which can work directly with images. Processing logic may train a deep learning model (e.g., CNN) to classify images with image classifications based on a training dataset to generate a trained deep learning model (e.g., trained CNN). In some embodiments, the processing logic trains the deep learning model using a transfer learning approach from one or more pre-trained networks to generate the trained deep learning model (e.g., trained CNN). In some embodiments, the processing logic is provided by the coaching server 120. The CNN may be optimized with hyperparameters (e.g., hyperparameters that provide the greatest accuracy) during a training session. Training of the deep learning model may be performed a priori from scratch using multiple images from the same application or using pre-trained deep learning models.

In some embodiments, relevant position images processed locally (e.g., using the client device that captured the relevant position images) or by a server (e.g., coaching server 120) may be analyzed using a second CNN to perform a more precise analysis of the subject's position to identify major joints of the body (e.g., ankle, knee, hip, shoulders, etc.). The image processing and position analysis component 212 may then calculate relevant angles or orientations between the joints and compare them to an "ideal" position (target position) for the position or exercise being analyzed, which, in some embodiments, is performed remotely by the coaching server 120. A grade may be generated based on a comparison of the target positions and orientations and the analyzed position and orientations. For example, the grade may be based on a deviations of the analyzed positions and orientations from the respective target positions and orientations of for identified joints of the subject's body, and the grade may be scaled appropriately (e.g., normalized based on "ideal" positions and orientations).

Other components utilized by and methods performed with the present embodiments may also include: defining and storing list of predefined movements (e.g., push-ups, sit-ups, etc.); a set of sub-positions for each movement (e.g., push-up high plank and low plank); a method for sequencing and timing each sub-movement to enable the identification of the pre-defined movement, which may include the implementation of a local CNN on the subject's client device; a method for selecting the key positions into the video feed, extracting the image of the sub-position from the video feed locally on the client device, transmitting the image to another CNN, and performing an analysis of the key position to be analyzed and scored by another CNN locally or on a remote server; a list of critical focal points for each sub-position, with each focal point being defined at the intersection (joint) of two body parts (e.g., the elbow being the joint of the forearm and the upper arm); and a list of target angles for each joint, with the angle being formed by the alignment of the two body parts.

In some embodiments, the coaching engine 130 may train a CNN based on a pre-defined set of movements. The coaching engine 130 may receive relevant sub-position images and process them using the CNN that has been trained to locate key focal points of the body and trace the intersection of body part alignment at this joint. The data generated by the CNN may be used, for example, by the client device 203 to render the coordinate positions of each joint, which may be displayed along with or without names of each joint in the sub-position image (e.g., as an overlay, as is illustrated in FIGS. 4-6). In some embodiments, an algorithm may be executed to calculate angles for each body part alignment for each relevant joint upon receiving coordinates of each joint for the various sub-positions. For example, each identified focal point may be assigned coordinates based on its location within the image of the subject. In some embodiments, the algorithm may receive each angle of each joint for each sub-position and calculate a corresponding grade. In some embodiments, the grade is calculated based on a correspondence table that computes grades that fall within angular ranges. The correspondence table may also tabulate grading criteria for main movements, positions, and durations of sub-positions, and also tabulate a grade for each movement and a related score. A scoring table may aggregate all scores of each movement to perform rankings.

The systems and methods herein, in some embodiments, will result in a set of data generated in response to observing positions and movements of the subject. Such data may include a number of repetitions of a list of movements, duration of a movement, score of a movement, grade of a movement, cumulative repetitions, cumulative durations, cumulative grade, and cumulative scores. In such embodiment, the data may be used to compute rankings of the subjects for different sets of time (all time, today, last week, last month, last 6 months etc.). The rankings may be transmitted to a client device and presented to the subject. The rankings may also be updated in real time after analysis results are computed for each newly performed exercise.

In some embodiments, "challenges" may be provided to various subjects to allow them to compete by performing the same movement or set of movements. The challenge can occur in real time, but can also be performed in non-real time. The challenge may be based on different indicators discussed herein, such as repetition of one or a list of movements, duration of a movement, score of a movement, grade of a movement, cumulative repetitions, cumulative durations, cumulative grade, and/or cumulative score.

In some embodiments, the subject may be provided with a "workout plan" based on his/her actual capacity to perform a movement (e.g., based on his/her average grade). In some embodiments, the system will recommend a specific training schedule. The system may then track the subject's performance and adapt the schedule based on the evolution of grades for the corresponding movement.

Figure 3:
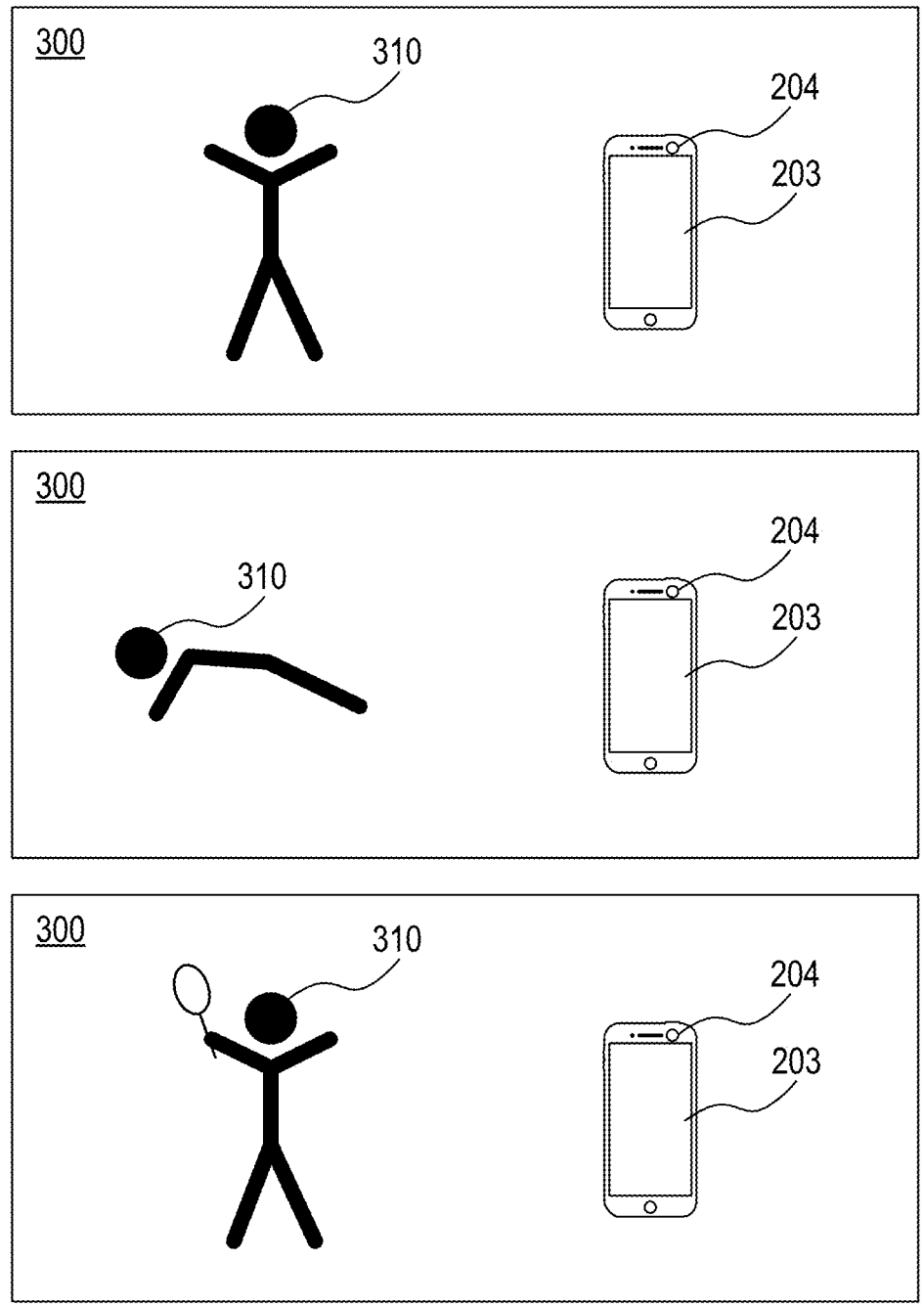
FIG. 3 illustrates an environment for implementing the embodiments described herein.

FIG. 3 illustrates an environment 300 for implementing the embodiments described herein. An exercise subject 310 may perform various actions in the presence of the client device 203 and record video of those actions using the camera 204. The actions may include maintaining particular exercise poses, performing particular exercises, and using exercise or sports equipment (e.g., tennis swings, golf strokes, etc. may be evaluated using the embodiments described herein). In some embodiments, an additional client device may be present. For example, the user (i.e., subject) may set up a first client device and position it to record his/her actions, and may set up a second client device in a location that allows the user to visualize the recorded video and/or real-time feedback.

FIGS. 4-6 illustrate embodiments of user interfaces for evaluating and grading exercise positions, and providing recommendations in connection with the same. In some embodiments, the user interfaces are in the form of a mobile application with a GUI including tutorials and user guides on how to use the service. In some embodiments, the GUI may include a start button to start the body scanning process, indications on how to position the body in front of the scanner (camera) in the form of a body shape, audio feedback on the triggering of the scanning, an audio and/or visual indication on the number of repetition of the movement in real time, and/or a visual extract of the series of movement including the time and duration of the exercise. In some embodiments, the GUI may provide authentication functionality. For example, the subject may be prompted to use a Touch ID to authenticate his/her identity, or may be asked to present his/her face to the camera of the client device to use facial recognition (e.g., Face ID) for authentication. In some embodiments, the facial recognition authentication is performed locally at the client device (e.g., the client device 102A), or may be performed remotely by a server (e.g., the coaching server 120 or other server). In some embodiments, at the end of a workout session, the GUI may provide a summary of the workout including a score, an image or video animation, a recommendation for improving the subject's performance, and/or a way to share this content on social networks (Facebook, Instagram, etc.). The GUI may also provide a history of all movements and rankings.

In some embodiments, the subject may calibrate scanning of his/her body using the camera of the client device with a calibration process provided by the software implemented by the client device. The calibration process may scan the body, identify the relevant focal points indicative of joint positions, surrounding environment (e.g., darkness, background objects, other people interfering, etc.) to improve the accuracy of the movement analysis. In some embodiments, the result of the scanning is provided to the subject through a visual gauge on the display screen and/or via audio feedback. In some embodiments, feedback provided may include guidance (including audio guidance) on distance from the camera, angle of view, environment, etc. In some embodiments, the calibration process utilizes inertial measurement unit (IMU) data generated by the client device to facilitate calibration with respect to camera position. Following the calibration process, the subject may be invited to start his/her exercise which may launch a body analysis session.

FIGS. 4 and 5 illustrate user interfaces 400 and 500 for evaluating and grading exercise positions accordance with an embodiment of the present disclosure. The user interface 400 includes images 410 and 450 capture of the subject during performance of an exercise, and information 420 pertaining to the exercise (e.g., repetition number, score or grade, etc.). In some embodiments, the subject is prompted to perform a series of different exercise or movements (e.g., push-ups, sit-ups, planks, squats, etc.) that have been pre-programmed in the application. The subject may be prompted to perform the movement one after another and receive feedback during the workout in real-time. Images 410 and 450 show two different repetitions of push-ups identified during the analysis, with sub-positions within each repetition.

In some embodiments, a model of the subject's physiology is generated, as discussed herein, and a visual rendering of the model may be overlaid on the images 410 and 450 in real time or after the exercise is performed. The visual rendering may identify focal points 430 indicative of joints or other areas of interest, such as terminal regions (e.g., the top of the subject's head), and connectors 440 that intersect the focal points 430, which are indicative of rigid portions of the subject's body located between the joints thereof. In some embodiments, the visual rendering of the position alignment may be displayed to the subject based on coordinates provided by the server to the client device or determined locally by the client device, which illustrates recommendations for areas of improvement on the position, for example, by using specific colors and markers for the focal points 430 and connectors 440 overlaid on static images or video of the exercise subject. In some embodiments, the recommendations engine 213 provides the application implemented by the client device with specific advice based on angular variations detected during the process to correct the movements of the subject.

FIG. 5 illustrates modeling of a particular repetition of push-ups, including grades for sub-positions within the repetition (e.g., "high plank" and "low plank"), with a combined grade derived from grades of the sub-positions (e.g., an average grade).

FIG. 6 illustrates a user interface 600 for providing visual feedback with respect to performance of an exercise movement in accordance with an embodiment of the present disclosure. The user interface 600 includes images 610 of the exercise subject (including sub-positions of the exercise), and details 620 pertaining to a particular series of exercises performed by the subject (e.g., total number, grade, total score, total time, etc.). In some embodiments, a recommendation table may include feedback 640A and 650A provided in a form of "tips" and "coaching advice" that may be provided for particular grade levels associated with each sub-position. The feedback 640A and 650A include respective feedback markers 640B and 650B, respectively, which are overlaid on the images 610 to direct the subject's attention to which part of the body the feedback 640A and 650A applies to. In some embodiments, tips may be provided in real-time in audio format. For processes that occur in real time, tips may be provided to the subject while he/she is performing the exercise visually, aurally, or a combination of both.

Figure 7A:
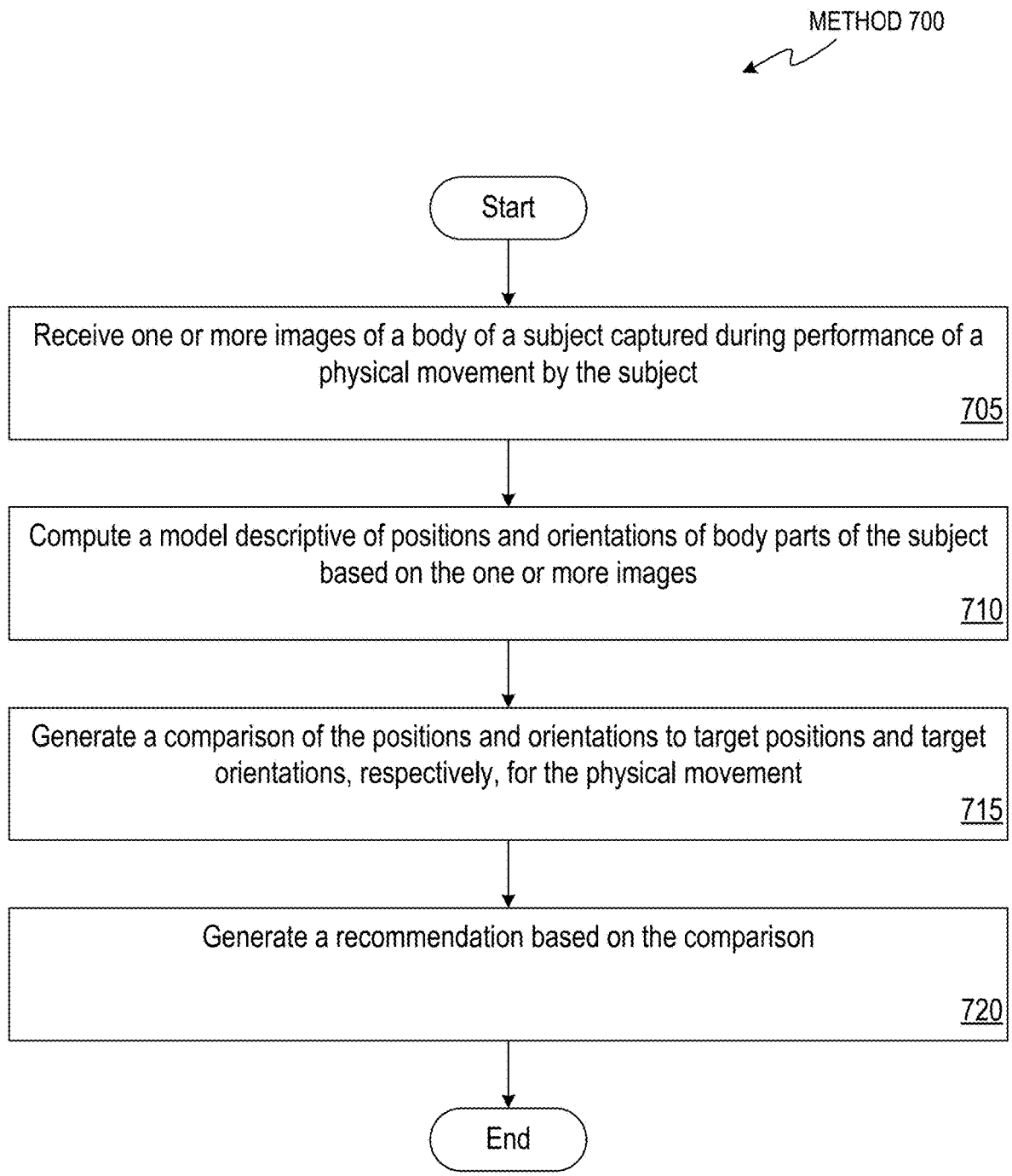
FIG. 7A is a flow diagram illustrating a method for evaluating human movement implemented by a server and/or a client device in accordance with an embodiment of the present disclosure.
Figure 7B:
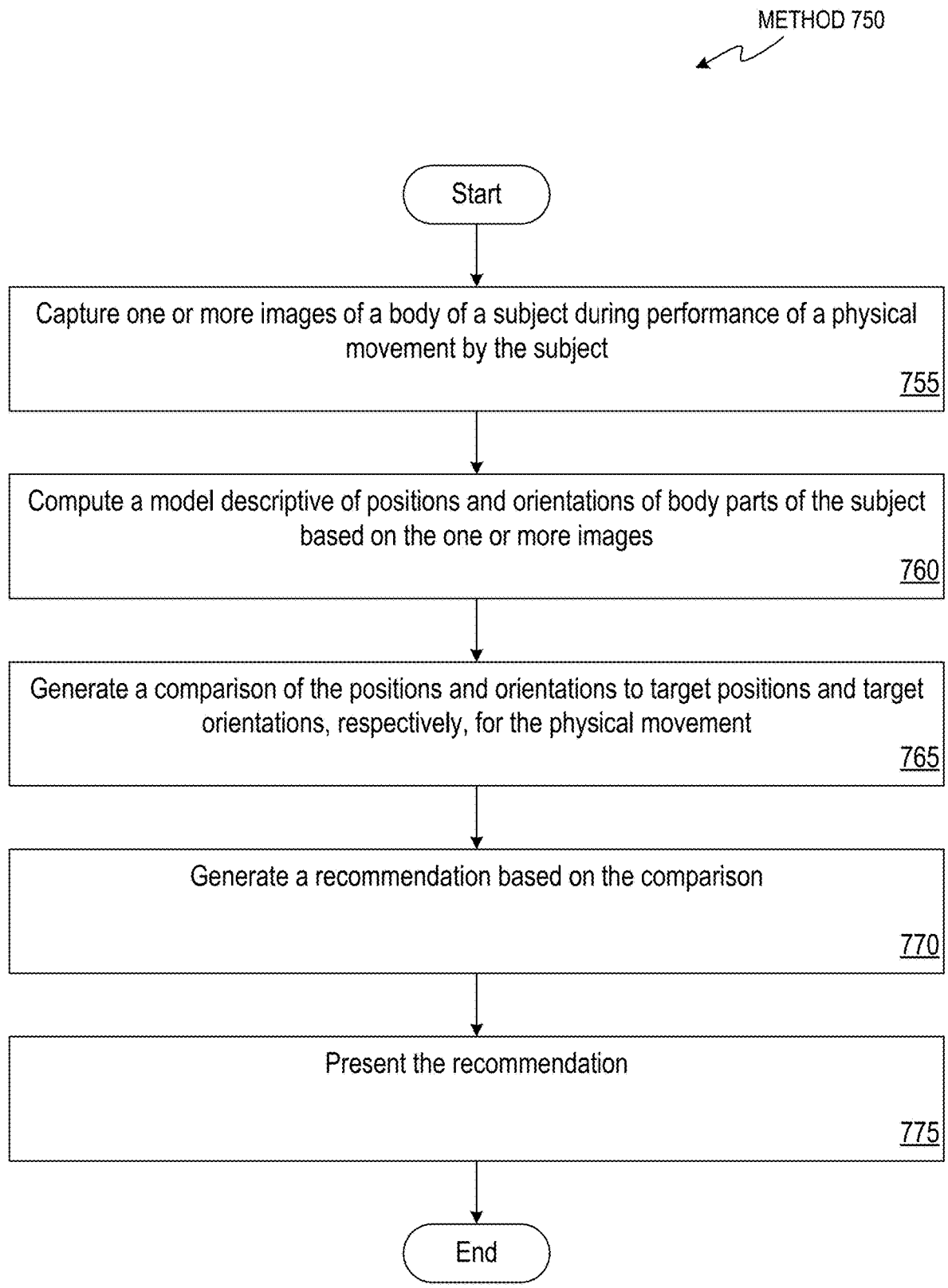
FIG. 7B is a flow diagram illustrating a method for evaluating human movement implemented by a client device in accordance with an embodiment of the present disclosure.

FIGS. 7A and 7B are a flow diagrams illustrating a method 700 and a method 750, respectively, for evaluating movement of a subject (e.g., during exercise) in accordance with embodiments of the present disclosure. The methods 700 and 750 may be performed by processing logic that includes hardware (e.g., circuitry, dedicated logic, programmable logic, microcode, etc.), software (e.g., instructions run on a processing device to perform hardware simulation), or a combination thereof.

In one embodiment, the method 700 is performed by a processing device executing the coaching engine 130 described with respect to FIGS. 1A-C and 2. In one embodiment, the method 700 is executed by a processing device of a server (e.g., the coaching server 120). In another embodiment, the method 700 is performed by a processing device of a client device (e.g., one of the client devices 102A-102Z). In other embodiments, some of the functionality of the method 700 is distributed between a server and a client device. In one embodiment, the method 750 is performed by a processing device of a client device (e.g., one of the client devices 102A-102Z).

Referring to FIG. 7A, the method 700 begins at block 705 when a processing device (e.g., a processing device of the coaching server 120) receives one or more images of a subject's body captured during performance of a physical movement by the subject. The one or more images may be in the form of video captured, for example, by a client device (e.g., client device 102A). In some embodiments, the images may be individual static images captured at different points during the subject's movement. For example, the client device may prompt the subject to perform a particular movement or hold a pose (e.g., a planking position), and capture an image of the subject when performed (e.g., by detecting based on image processing that the user is in a target position).

At block 710, the processing device computes a model descriptive of positions and orientations of body parts of the subject based on the one or more images. The processing device may, for example, identifying within the one or more images the locations of focal points (e.g., regions indicative of joints or other areas of interest of the subject's body) that are associated with body parts of the subject. The processing device may then derive positions and orientations of the body parts (e.g., coordinates of areas of interest within the one or more images relative to a frame of reference and/or each other, angles between rigid portions of the body such as an angle between the subject's thigh and calf). The positions may be used to compute lengths of the rigid body parts may, which, in some embodiments, are maintained as constant values during the subsequent analysis to facilitate mapping of the model to images of the subject as the subject moves.

At block 715, the processing device generates a comparison of the positions and orientations to target positions and target orientations, respectively, for the physical movement. In some embodiments, the positional deviations are computed from differences between the identified positions and target positions associated with the movement. Similarly, in some embodiments, orientational deviations are computed from differences between the identified orientations target orientations (e.g., target angles of joints). The comparison may be generated as a score or grade based on the computed positional and orientational deviations (e.g., as a weighted sum of the two, or some other relationship).

At block 720, the processing device generates a recommendation of the comparison (e.g., a visual recommendation, an audio recommendation, or a combination thereof). In some embodiments, the recommendation is in the form of a score, grade, or instruction to be provided to the subject. The instruction may be such that the subject is instructed to perform a physical maneuver that, if so performed, will result in the reduction of positional deviations and orientational deviations computed from a subsequently captured image of the body of the subject. For example, if the subject is performing push-ups, an instruction may be that the subject lowers his/her shoulders, which, if the user complies, may result in an improved score or grade when positions and orientations of the subject's model are compared to the target position and orientations. In some embodiments, the processing device transmits the recommendation to another device, such as a client device utilized by the subject.

In some embodiments, the processing device may generate or receive (e.g., from the client device) authentication data indicative of an identity of the subject. The authentication data may then be stored with a record associated with the subject, for example, in a database (e.g., in the data store 110 or other storage). In some embodiments, the authentication data is generated by identifying the subject (e.g., the subject's face) in the one or more images.

Referring to FIG. 7B, the method 750 may be performed in a similar manner as the method 700, except that each step is executed by a processing device of a client device (e.g., the client device 102A). The method 750 begins at block 755 when the processing device captures one or more images of the subject's body during performance of a physical movement by the subject.

At block 760, the processing device computes a model descriptive of positions and orientations of body parts of the subject based on the one or more images.

At block 765, the processing device generates a comparison of the positions and orientations to target positions and target orientations, respectively, for the physical movement.

At block 770, the processing device generates a recommendation based on the comparison.

At block 775, the processing device presents the recommendation to the subject or another individual (e.g., a health care provider), for example, by displaying the recommendation visually by the client, by generating an audio-based recommendation, or through some other method (e.g., generating a haptic feedback).

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Figure 8:
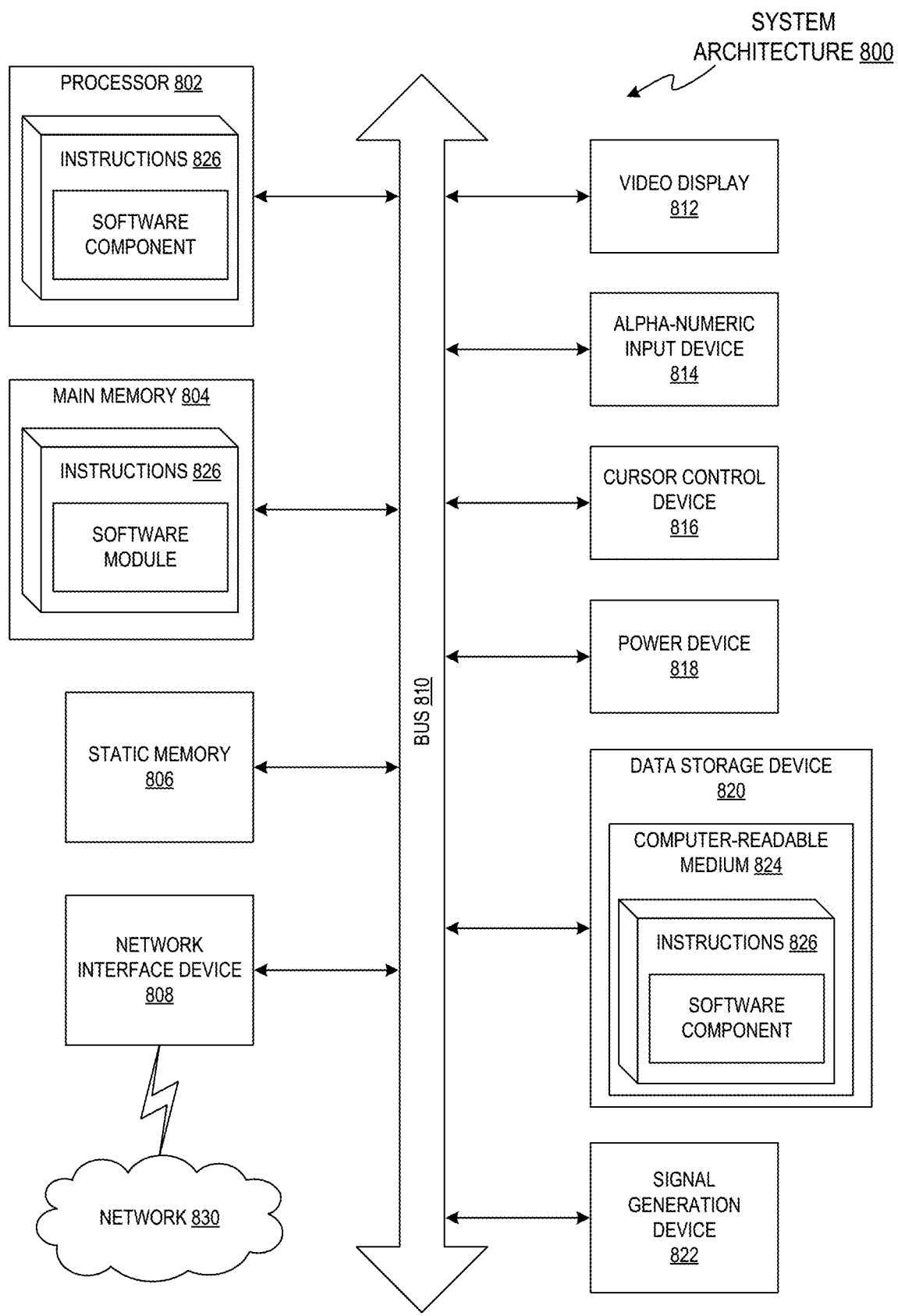
FIG. 8 is a block diagram illustrating an exemplary computer system in accordance with an embodiment of the present disclosure.

FIG. 8 illustrates a diagrammatic representation of a machine in the exemplary form of a computer system 800 within which a set of instructions (e.g., for causing the machine to perform any one or more of the methodologies discussed herein) may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 800 may be utilized by or illustrative of any of the data store 110, one or more of the client devices 102A-102Z, or the coaching server 120.

The exemplary computer system 800 includes a processing device (processor) 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 820, which communicate with each other via a bus 810.

In some embodiments, the exemplary computer system 800 may further include a graphics processing unit (GPU) that comprises a specialized electronic circuit for accelerating the creation and analysis of images in a frame buffer for output to a display device. In some embodiments, because of its special design, a GPU may be faster for processing video and images than a CPU of the exemplary computer system 800. Certain embodiments of the present disclosure that implement one or more CNNs may benefit by increased performance speed by utilizing a GPU to implement the CNN, which may allow for both local implementation (client side) and remote implementation (server-side).

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute instructions 826 for performing any of the methodologies and functions discussed herein.

The computer system 800 may further include a network interface device 808. The computer system 800 also may include a video display unit 812 (e.g., a liquid crystal display (LCD), a light-emitting diode (LED) display, a cathode ray tube (CRT), etc.), an alphanumeric input device 814 (e.g., a keyboard), a cursor control device 816 (e.g., a mouse), and a signal generation device 822 (e.g., a speaker).

Power device 818 may monitor a power level of a battery used to power the computer system 800 or one or more of its components. The power device 818 may provide one or more interfaces to provide an indication of a power level, a time window remaining prior to shutdown of computer system 800 or one or more of its components, a power consumption rate, an indicator of whether computer system is utilizing an external power source or battery power, and other power related information. In some embodiments, indications related to the power device 818 may be accessible remotely (e.g., accessible to a remote back-up management module via a network connection). In some embodiments, a battery utilized by the power device 818 may be an uninterruptable power supply (UPS) local to or remote from computer system 800. In such embodiments, the power device 818 may provide information about a power level of the UPS.

The data storage device 820 may include a computer-readable storage medium 824 on which is stored one or more sets of instructions 826 (e.g., software) embodying any one or more of the methodologies or functions described herein. The instructions 826 may also reside, completely or at least partially, within the main memory 804 and/or within the processor 802 during execution thereof by the computer system 800, the main memory 804 and the processor 802 also constituting computer-readable storage media. The instructions 826 may further be transmitted or received over a network 830 (e.g., the network 105) via the network interface device 808.

In one embodiment, the instructions 826 include instructions for one or more software components for implementing one or more of the methodologies or functions described herein. While the computer-readable storage medium 824 is shown in an exemplary embodiment to be a single medium, the terms "computer-readable storage medium" or "machine-readable storage medium" should be taken to include a single medium or multiple media (e.g., a centralized or distributed database, and/or associated caches and servers) that store the one or more sets of instructions. The terms "computer-readable storage medium" or "machine-readable storage medium" shall also be taken to include any transitory or non-transitory medium that is capable of storing, encoding, or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description may have been presented in terms of algorithms and symbolic representations of operations on data bits within a computer memory. These algorithmic descriptions and representations are the mode through which those skilled in the data processing arts most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "receiving," "retrieving," "transmitting," "computing," "generating," "adding," "subtracting," "multiplying," "dividing," "deriving," "optimizing," "calibrating," "detecting," "performing," "analyzing," "determining," "enabling," "identifying," "modifying," "transforming," "applying," "comparing," "aggregating," "extracting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus, device, or system for performing the operations herein. This apparatus, device, or system may be specially constructed for the required purposes, or it may include a general purpose computer selectively activated or reconfigured by a computer program stored in the computer. Such a computer program may be stored in a computer- or machine-readable storage medium, such as, but not limited to, any type of disk including floppy disks, optical disks, compact disk read-only memories (CD-ROMs), and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application should generally be construed to mean "one or more" unless specified otherwise or clear from context to be directed to a singular form. Reference throughout this specification to "an embodiment" or "one embodiment" means that a particular feature, structure, or characteristic described in connection with the embodiment is included in at least one embodiment. Thus, the appearances of the phrase "an embodiment" or "one embodiment" in various places throughout this specification are not necessarily all referring to the same embodiment. Moreover, it is noted that the "A-Z" notation used in reference to certain elements of the drawings is not intended to be limiting to a particular number of elements. Thus, "A-Z" is to be construed as having one or more of the element present in a particular embodiment.

The present disclosure is not to be limited in scope by the specific embodiments described herein. Indeed, other various embodiments of and modifications to the present disclosure, in addition to those described herein, will be apparent to those of ordinary skill in the art from the preceding description and accompanying drawings. Thus, such other embodiments and modifications are intended to fall within the scope of the present disclosure. Further, although the present disclosure has been described herein in the context of particular embodiments in particular environments for particular purposes, those of ordinary skill in the art will recognize that its usefulness is not limited thereto and that the present disclosure may be beneficially implemented in any number of environments for any number of purposes.

What is claimed is:

1. A method of evaluating movement of a subject, the method comprising:
   receiving one or more images of a body of the subject captured during performance of a physical movement by the subject;
   inputting the one or more images into an initial convolutional neural network (CNN) image classification model to identify subject positions from the received one or more images;
   inputting the one or more images output from the initial CNN into a subsequent CNN image classification model in which the subsequent CNN image classification model is used to infer body pose estimations for the subject;
   computing a subject model descriptive of positions and orientations of body parts of the subject based on the input of the one or more images to the subsequent CNN's image classification model;

generating a comparison of the positions and orientations to target positions and target orientations, respectively, for the physical movement;
generating a recommendation based on the comparison; and
exposing the recommendation on a client device for presenting to the subject.

2. The method of claim 1, wherein the one or more images are in a form of video captured by the client device.

3. The method of claim 1, wherein computing the subject model comprises:
identifying within the one or more images locations of joints associated with the body parts of the subject, in which the joints are identified based on the input of the one or more images to the subsequent CNN's image classification model; and
deriving the positions and orientations of the body parts from the identified locations of joints.

4. The method of claim 1, wherein generating the comparison comprises, for each body part of the subject model:
computing positional deviations from the positions to the target positions;
computing orientational deviations from the orientations and the target orientations; and
computing the comparison as a score based on the computed positional deviations and orientational deviations.

5. The method of claim 4, wherein generating the recommendation comprises:
generating, based on the score, an instruction to be provided to the subject that instructs the subject to perform a physical maneuver that, if so performed, will result in reduction of positional deviations and orientational deviations computed from a subsequently captured image of the body of the subject.

6. The method of claim 1, further comprising:
generating or receiving authentication data indicative of an identity of the subject; and
storing the authentication data in a record associated with the subject.

7. The method of claim 6, wherein generating the authentication data comprises:
generating the authentication data by identifying the subject within the one or more images.

8. A system for evaluating movement of a subject, the system comprising:
a memory; and
a processing device operatively coupled to the memory, wherein the processing device is configured to:
receive one or more images of a body of the subject captured during performance of a physical movement by the subject;
input the one or more images into an initial convolutional neural network (CNN) image classification model to identify subject positions from the received one or more images;
input the one or more images output from the initial CNN into a subsequent CNN image classification model in which the subsequent CNN image classification model is used to infer body pose estimations for the subject;
compute a subject model descriptive of positions and orientations of body parts of the subject based on the input of the one or more images to the subsequent CNN's image classification model;
generate a comparison of the positions and orientations to target positions and target orientations, respectively, for the physical movement;
generate a recommendation based on the comparison; and
expose the recommendation on a client device for presenting to the subject.

9. The system of claim 8, wherein the one or more images are in a form of video captured by the client device.

10. The system of claim 8, wherein to compute the subject model, the processing device is further configured to:
identify within the one or more images locations of joints associated with the body parts of the subject, in which the joints are identified based on the input of the one or more images to the subsequent CNN's image classification model; and
derive the positions and orientations of the body parts from the identified locations of joints.

11. The system of claim 8, wherein to generate the comparison, the processing device is further configured to, for each body part of the subject model:
compute positional deviations from the positions to the target positions;
compute orientational deviations from the orientations and the target orientations; and
compute the comparison as a score based on the computed positional deviations and orientational deviations.

12. The system of claim 11, wherein to generate the recommendation, the processing device is further configured to:
generate, based on the score, an instruction to be provided to the subject that instructs the subject to perform a physical maneuver that, if so performed, will result in reduction of positional deviations and orientational deviations computed from a subsequently captured image of the body of the subject.

13. The system of claim 8, wherein the processing device is further configured to:
generate or receiving authentication data indicative of an identity of the subject; and
store the authentication data in a record associated with the subject.

14. The system of claim 13, wherein to generate the authentication data, the processing device is further configured to:
generate the authentication data by identifying the subject within the one or more images.

15. A non-transitory, computer-readable storage medium having instructions encoded thereon that, when executed by a processing device of a client device, cause the processing device to:
receive one or more images of a body of a subject captured during performance of a physical movement by the subject;
inputting the one or more images into an initial convolutional neural network (CNN) image classification model to identify subject positions from the received one or more images;
input the one or more images output from the initial CNN into a subsequent CNN image classification model in which the subsequent CNN image classification model is used to infer body pose estimations for the subject;
compute a subject model descriptive of positions and orientations of body parts of the subject based on the input of the one or more images to the subsequent CNN's image classification model;
generate a comparison of the positions and orientations to target positions and target orientations, respectively, for the physical movement;
generate a recommendation based on the comparison; and expose the recommendation on the client device for presenting to the subject.

16. The non-transitory, computer-readable storage medium of claim 15, wherein the one or more images are in a form of video captured by the client device.

17. The non-transitory, computer-readable storage medium of claim 15, wherein to compute the subject model, the instructions further cause the processing device to:
identify within the one or more images locations of joints associated with the body parts of the subject, in which the joints are identified based on the input of the one or more images to the subsequent CNN's image classification model; and
derive the positions and orientations of the body parts from the identified locations of joints.

18. The non-transitory, computer-readable storage medium of claim 15, wherein to generate the comparison, the instructions further cause the processing device to, for each body part of the subject model:
compute positional deviations from the positions to the target positions;
compute orientational deviations from the orientations and the target orientations; and
compute the comparison as a score based on the computed positional deviations and orientational deviations.

19. The non-transitory, computer-readable storage medium of claim 18, wherein to generate the recommendation, the instructions further cause the processing device to:
generate, based on the score, an instruction to be provided to the subject that instructs the subject to perform a physical maneuver that, if so performed, will result in reduction of positional deviations and orientational deviations computed from a subsequently captured image of the body of the subject.

20. The non-transitory, computer-readable storage medium of claim 15, the instructions further cause the processing device to:
generate or receiving authentication data indicative of an identity of the subject; and
store the authentication data in a record associated with the subject.

21. The non-transitory, computer-readable storage medium of claim 20, wherein to generate the authentication data, the instructions further cause the processing device to:
generate the authentication data by identifying the subject within the one or more images.

22. A non-transitory, computer-readable storage medium having instructions encoded thereon that, when executed by a processing device of a client device, cause the processing device to:
capture one or more images of a body of a subject during performance of a physical movement by the subject;
input the one or more images into an initial convolutional neural network (CNN) image classification model to identify subject positions from the received one or more images;
input the one or more images output from the initial CNN into a subsequent CNN image classification model in which the subsequent CNN image classification model is used to infer body pose estimations for the subject;
compute a subject model descriptive of positions and orientations of body parts of the subject based on the input of the one or more images to the subsequent CNN's image classification model;
generate a comparison of the positions and orientations to target positions and target orientations, respectively, for the physical movement;
generate a recommendation based on the comparison; and
present the recommendation to the subject.

23. The method of claim 1, wherein the initial or subsequent CNN image classification model is optimized with hyperparameters to enhance the computed subject model.

24. The method of claim 1, wherein the input of the one or more images to the initial CNN, the subsequent CNN, the computing of the subject model, and the generated recommendation is performed in real-time.

25. The method of claim 24, wherein the real-time performance signifies the recommendation is generated during the performance of the physical movement by the subject.

26. The method of claim 1, wherein the subject model is computed on the client device.

27. The method of claim 26, wherein the client device is a smartphone computer.

28. The method of claim 1, wherein the subsequent CNN is trained to identify positions and orientations of subjects.

29. The method of claim 28, wherein the subsequent CNN is trained to locate focal points of the subject's body.

30. The method of claim 3, further comprising rendering coordinate positions of the subject's joints based on the identified locations of joints.

* * * * *